United States Patent [19]

Nagel et al.

[11] Patent Number: 5,767,181
[45] Date of Patent: Jun. 16, 1998

[54] ELASTOMERS WITH IMPROVED MOLD RELEASE

[75] Inventors: Walter R. Nagel; C. Richard Costin, both of West Chester, Pa.

[73] Assignee: Sartomer Company, Exton, Pa.

[21] Appl. No.: 763,517

[22] Filed: Dec. 11, 1996

Related U.S. Application Data

[63] Continuation of Ser. No. 298,398, Aug. 30, 1994, abandoned.

[51] Int. Cl.⁶ .................................................. C08J 5/36
[52] U.S. Cl. .......................... 524/394; 524/399; 524/400
[58] Field of Search .................................. 524/394, 399, 524/400

[56] References Cited

U.S. PATENT DOCUMENTS

| | | | |
|---|---|---|---|
| 2,876,203 | 3/1959 | Miller et al. | 260/23.7 |
| 2,939,898 | 6/1960 | Aron | 260/752 |
| 3,167,533 | 1/1965 | Donat | 260/86.3 |
| 3,189,582 | 6/1965 | Donat et al. | 260/85.5 |
| 3,189,587 | 6/1965 | Donat | 260/92.8 |
| 3,196,134 | 7/1965 | Donat et al. | 260/78.5 |
| 3,201,361 | 8/1965 | Aron | 260/23.7 |
| 3,249,594 | 5/1966 | Donat et al. | 260/84.1 |
| 3,256,227 | 6/1966 | Krause | 260/23.7 |
| 3,257,346 | 6/1966 | Gruver et al. | 260/23 |
| 3,344,100 | 9/1967 | Donat et al. | 260/23.7 |
| 3,408,320 | 10/1968 | Brucksch | 260/23.5 |
| 3,434,991 | 3/1969 | Aron | 260/23.7 |
| 3,468,828 | 9/1969 | Perrine et al. | 260/23.7 |
| 3,477,978 | 11/1969 | Holub et al. | 260/23.7 |
| 3,488,306 | 1/1970 | Thormahlen | 260/23 |
| 3,528,936 | 9/1970 | Kent et al. | 260/23.7 |
| 3,549,744 | 12/1970 | Compton | 264/300 |
| 3,553,160 | 1/1971 | Schröder et al. | 260/45.75 |
| 3,577,478 | 5/1971 | Thorpe | 260/862 |
| 3,579,484 | 5/1971 | Thomas | 260/78.4 |
| 3,591,540 | 7/1971 | Praskach | 260/23 |
| 3,647,723 | 3/1972 | Mysik et al. | 260/25 B |
| 3,649,578 | 3/1972 | Bush et al. | 260/23 AR |
| 3,666,697 | 5/1972 | Peloza | 260/22 CB |
| 3,703,491 | 11/1972 | Takayama et al. | 260/23.7 M |
| 3,969,434 | 7/1976 | Powell et al. | 260/897 B |
| 3,976,611 | 8/1976 | Aloia | 260/80.72 |
| 4,077,939 | 3/1978 | Paparatto et al. | 260/40 R |
| 4,164,818 | 8/1979 | Ohshima et al. | 34/12 |
| 4,191,671 | 3/1980 | Kataoka et al. | 260/23.7 |
| 4,526,951 | 7/1985 | Lundberg et al. | 526/240 |
| 4,720,526 | 1/1988 | Roland | 525/273 |
| 4,876,019 | 10/1989 | Meyer et al. | 252/32.5 |
| 5,008,033 | 4/1991 | Meyer et al. | 252/182.13 |
| 5,160,538 | 11/1992 | Mafoti | 106/243 |
| 5,214,108 | 5/1993 | Harrell | 525/387 |
| 5,260,123 | 11/1993 | Hergenrother et al. | 428/246 |

FOREIGN PATENT DOCUMENTS 2078688  1/1982  United Kingdom.

*Primary Examiner*—Peter D. Mulcahy
*Attorney, Agent, or Firm*—Michael B. Fein; Schnader Harrison Segal & Lewis LLP

[57] ABSTRACT

Curable and cured elastomer compositions having approved mold release and methods for their preparation are provided. The elastomer compositions comprise an elastomer, a metal salt of an $\alpha, \beta$-ethylenically unsaturated compound, an organic peroxide, and a fatty acid metal salt. The invention provides for improved mold release by the incorporation of the fatty acid metal salt into the elastomer composition, at high levels, without a loss in cured properties of the elastomer.

10 Claims, No Drawings

ELASTOMERS WITH IMPROVED MOLD RELEASE

This application is a continuation of application Ser. No. 08/298,398 filed on Aug. 30, 1994 now abandoned.

FIELD OF THE INVENTION

The present invention relates to elastomers with improved mold release. More specifically the present invention relates to curable and cured elastomers in which metal salts of $\alpha$, $\beta$-ethylenically unsaturated carboxylic acids are used as curing coagents and in which fatty acid metal salts are incorporated to improve mold release.

BACKGROUND OF THE INVENTION

It is known that the use of metal salts of $\alpha$, $\beta$-ethylenically unsaturated carboxylic acids as curing coagents in elastomers improves the properties of the cured elastomers. However, it has been observed that the use of the carboxylic acid metal salts also increases the adhesion of the elastomers to metal. This increased adhesion may result in severe mold release problems.

Conventional mold release agents that may be used to coat the mold prior to molding an elastomer are well known. However, there are a number of disadvantages to coating the mold with a mold release agent. These disadvantages include the accumulation of deposits of the agent on the mold and adherence of the agent to the surface of the molded article. Additionally, the coated mold release agents make the molding process less efficient and more expensive.

Certain elastomeric compositions which incorporate mold release agents are also known. U.S. Pat. No. 3,549,744 to Compton discloses a silicone elastomer composition which is non-adherent to metal molds. The silicone elastomer composition comprises silicone rubber, reinforcing silica fibers, an organic peroxide vulcanizing agent and 0.05 to 2 P.H.R. of a metal salt of a 16 to 26 carbon carboxylic acid metal salt. Exemplary carboxylic acids disclosed are palmitic acid, margaric acid, stearic acid, nondecanoic acid, arachidic acid, hexeicosanoic acid, behenic acid, tri-, tetra-, and pentacosanoic acid, and cerotic acid.

U.S. Pat. No. 3,201,361 to Aron discloses a mold release composition for sulfur-cured elastomers. The mold release composition, which is mixed with the compounded rubber, is a mixture of 11 to 16% of a zinc, magnesium, lead or calcium oleate salt, 50 to 60% of a petroleum jelly or paraffin wax, 4 to 6% of an eight to eighteen carbon monohydric branched chain alkyl or a twelve to twenty carbon monohydric fatty alcohol, 4.5 to 6.7% potassium stearate, and 14 to 26% excess stearic acid.

The present invention provides for the improved mold release of elastomers in which an $\alpha$, $\beta$-ethylenically unsaturated carboxylic acid metal salt is present as a curing coagent. The improved mold release is achieved through the incorporation of a fatty acid metal salt into the elastomer.

SUMMARY OF THE INVENTION

The present invention provides curable and cured elastomer compositions, and processes for their preparation, in which $\alpha$, $\beta$-ethylenically unsaturated carboxylic acid metal salts are present as curing coagents, which compositions exhibit improved mold release as well as good cured properties. It has been discovered that the improved mold release, without loss of cured properties, may be achieved in these elastomer compositions by incorporating a fatty acid metal salt into the composition.

DESCRIPTION OF THE PREFERRED EMBODIMENTS

The term "elastomer" as used herein, is intended to include, without limitation, the elastomeric organic high polymers, including natural rubber and the various synthetic rubbers which cure, i.e., vulcanize or cross-link, with a free radical generating compound. In general, these curable rubbers are polymers of conjugated dienes or polymers with abstractible hydrogen, wherein the monomers are linked through carbon-carbon bonds. Exemplary elastomers include, without limitation, ethylene vinyl acetate copolymers, ethylene propylene elastomer, ethylene propylene diene elastomer, styrenebutadiene elastomer, polybutadiene elastomer, nitrile elastomer, hydrogenated nitrile elastomer, polyisoprene elastomer, silicone elastomer, polyurethane elastomer, polysulfide elastomer, polyethylene, chloropolyethylene, chlorosulfonyl polyethylene, acrylonitrile butadiene styrene elastomer, ethylene butylacrylate, ethylene acrylic elastomer, fluor elastomer, bromobutyl elastomer, butyl elastomer modified with divinyl benzene and the like. These elastomers are all commercially available.

The elastomer suitable for use in the invention may be cured by a variety of methods including peroxide/coagent cure, radiation cure, sulfur cure, and thiadiazole cure. The present invention preferentially utilizes a peroxide/coagent cure with the peroxide advantageously employed in the present invention being an organic peroxide.

By way of illustration, suitable organic peroxides include, without limitation, diacetyl peroxide, dibenzoyl peroxide, dicapryl peroxide, di-(p-chloro-benzoyl) peroxide, didecanoyl peroxide, di-(2,4-dichlorobenzoyl) peroxide, diisobutyl peroxide, diisonanoyl peroxide, dilauroyl peroxide, dipelargonyl peroxide, dipropynyl peroxide, methyl ethyl ketone peroxide, cyclohexanone peroxide, dihydroxy-dimethyl-dioxacyclopentane, t-butyl peroxide, t-butyl peroxy(2-ethylhexanoate), t-butylperoxyisobutylate, O,O-t-butyl-0-isopropylmonoperoxy-carbonate, t-butylperoxy pivalate, dimethyl-dibenzoylperoxy)-hexane, t-butyl-peroxy (2-ethylbutylate), di-t-butyl peroxide, dicumyl peroxide, 2,5-bis(t-butylperoxy)-2,5-dimethylhexane, t-butyl hydroperoxide, cumyl hydroperoxide, $\alpha,\alpha$-bis--(t-butyl peroxy)diisopropyl benzene, 1,1-di-t-butylperoxy-3,3,5-trimethylcyclohexane and the like alone or in combination. The foregoing organic peroxides, and other suitable peroxides, are well known to those ordinarily skilled in the art and are commercially available.

The amount of organic peroxide used in the present invention may be varied depending on the elastomer and cross-linking coagent selected. The required amount of organic peroxide to practice the present invention is a cure-effective amount readily ascertainable by one of ordinary skill in the art. Generally, an amount of from about 0.1 to about 15 parts, preferably from about 0.5 to about 10 parts, by weight per hundred parts by weight of the elastomer is used.

The elastomer utilized in the present invention is one in which metal salts of certain $\alpha$, $\beta$-ethylenically unsaturated carboxylic acids, specifically metal salts of acrylic and methacrylic acid, are incorporated. These metal salts are known to improve the physical properties of the elastomer as well as to increase the adhesion of the elastomers to polar surfaces, such as metal.

Examples of the metal component that may be used for the metal salts of the acrylic and methacrylic acids include, without limitation, zinc, magnesium, sodium, potassium, calcium, barium, cobalt, copper, aluminum, and iron. Typically, zinc is preferred due to its effectiveness and ease of manufacture. The metal may be incorporated into the elastomer by using the metal salt of the acrylic or methacrylic acid obtained by reacting the metal compound and the acrylic or methacrylic acid. Alternatively, the acrylic or methacrylic acid and the metal compound, i.e., metal oxide, metal hydroxide, metal carbonate and the like may be added separately into the elastomer and reacted to form the metal salts in situ.

Generally, the amount of α, β-ethylenically unsaturated carboxylic acid metal salt used is a crosslinking-effective amount. More specifically, an amount from about 0.01 to about 100 parts, preferably from about 0.1 to about 20 parts, by weight per hundred parts by weight of the elastomer is used.

The present invention is based on the recognition that, in elastomer compositions in which α, β-ethylenically unsaturated carboxylic acid metal salts are used as crosslinking coagents, severe mold release problems result. It has been discovered that the incorporation of high levels of metal salts of certain fatty acids will result in improved mold release in these compositions. Surprisingly and unexpectedly, the improved mold release is achieved without loss of the cured properties of the elastomer.

The precise mechanism by which the fatty acid metal salts improve mold release is unknown. One possible theory is that the metals of the fatty acid metal salt and the α, β-ethylenically unsaturated carboxylic acid metal salt compete for active sites on the surface of the mold. If the metal of the fatty acid metal salt preferentially consumes the active sites, the adhesion imparted by the α, β-ethylenically unsaturated carboxylic acid metal salt would be reduced.

By the term "fatty acid", as used herein, is meant those carboxylic acids derived from, or contained in, the fats or oils found in animals or vegetables. Such fatty acids, generally, are four to twenty-two carbon chains of alkyl groups that terminate in a carboxyl radical.

Both saturated and unsaturated fatty acids may be used in the present invention. Exemplary saturated fatty acids include, without limitation, butyric acid, caproic acid, caprylic acid, capric acid, lauric acid, myristic acid, palmitic acid, and stearic acid. Illustrative unsaturated fatty acids include, without limitation, palmitoleic acid, oleic acid, linoleic acid, linolenic acid, and erucic acid. Stearic acid is particularly preferred.

The metal component of the fatty acid metal salts may be, without limitation, zinc, calcium, barium, lithium, magnesium, sodium aluminum, and tin. Preferably, the metal component is zinc or calcium. Zinc is particularly preferred.

The fatty acid metal salts may be incorporated into the elastomer or the fatty acid and the metal compound may be added to the elastomer separately and reacted to form the metal salt of the fatty acid in situ. The preferred fatty acid metal salt is zinc stearate.

The amount of the fatty acid metal salt to be used is critical because too little of an amount will not produce improvement in mold release while too great of an amount will result in the loss of cured properties. The precise amount of fatty acid metal salt utilized will depend on the amount of α, β-ethylenically unsaturated carboxylic acid metal salt utilized. It has been discovered that a mold releasing-effective amount of the fatty acid metal salt is, generally, from about 1.5 parts to about 3 parts fatty acid metal salt for each 1 part α, β-ethylenically unsaturated carboxylic acid metal salt. Preferably, an amount of about 2 parts fatty acid metal salt for each 1 part α, β-ethylenically unsaturated carboxylic acid metal salt is used.

Without departing from the scope of the present invention, and as appreciated by those skilled in the art, inert fillers may be included in the methods and compositions of the invention. If an inert filler is desired, any known or conventional filler which does not interfere with the vulcanization process described herein may be used, and such fillers are desirable in finely divided form. Suitable fillers include, without limitation, silica fillers, thermal blacks, clays, kaolin, diatomaceous earth, zinc oxide, cork, titania, flocs, fibrous fillers such as glass and synthetic fibers, metal, oxides, carbonates, and the like. The amount of inert filler is dictated by its type and the intended end-use of the elastomeric composition and, generally, is less than about 30 parts, preferably 15 parts, by weight per 100 parts by weight of the elastomer.

Other additives that may be utilized in the methods and compositions of the present invention include, without limitation, scorch retardants, antioxidants, UV stabilizers, antiozonants, plasticizers, tackifers, anti-tack agents, processing acids, coloring agents, and the like.

In the present invention, the aforementioned ingredients may be mixed by any of the conventional means. Mixing may be accomplished by charging the ingredients to a Banbury mixer or a rubber mixing mill and intimately mixing the ingredients until the composition is uniform. The temperature of the mixing operation is not critical, but should be below temperatures at which the curing reaction commences. Generally, normal elastomer milling practice may be employed.

Curing times, in general, range from about 1 to 30 minutes, preferably from about 5 to 15 minutes. Cure temperatures and pressures should be sufficient to melt or soften the reactants and to thermally decompose the organic peroxide. Thus, the selection of the cure temperature will be predicated upon the elastomer, coagent and organic peroxide selected. The temperatures useful in the present invention may vary between wide limits such as from 50° C. to 250° C. For curing large rubber rolls, cure times of 24 hours are common to avoid stressing the roll.

The invention will be further clarified by a consideration of the following examples, which are intended to be purely exemplary.

EXAMPLES

In the following tables, all of the ingredients are expressed in parts by weight, unless otherwise noted, and each column corresponds to a numbered example.

The formulations were tested, as indicated on Tables 1 and 2, in the following manner. The unvulcanized elastomer compound strip was gauged to about 0.025 inch with the two roll mill and cut into strips for lap shear adhesion testing. Cold rolled steel adhesion coupons 1×3 inches and about 0.030 inch thick were methanol washed and dried. The coupons were overlapped by 1 inch with the compound strip between and placed in a 0.075 inch plaque mold, preheated to 320° F., and then cured for twenty five minutes. Lap shear adhesion was measured on a Thwing-Albert tensile tester in accordance with ASTM D-412 using a jaw separation speed of 1.0 IPM. The results obtained may be found reported on Tables 1 and 2.

Mold release was tested, subjectively, by compression molding the compound in a clean 0.075 mil. plaque mold for 20 minutes at 320° F. The mold was then opened. Mold release was considered good if the halves of the mold opened by prying them apart with a screw driver. Mold release was considered poor if the mold halves had to be separated by hammering a wedge between the halves.

Vulcanization characteristics were determined with a Tech Pro ODR using a 1.0° arc. Vulcanization characteristics were determined at 320° F. Vulcanization characteristics measured include, $TS_1$, TC (90), and maximum torque (MHF) and the result are reported on Tables 1 and 2.

Specimens of 0.075 mil. thickness were compression molded and cured for 20 min. at 320° F. the specimens were air cooled and aged one day before being tested on a Thwing Albert tensile tester in accordance with ASTM D-412. Modulus values at 100 percent elongation were recorded in accordance with ASTM D-412. Shore A hardness values were obtained in accordance with ASTM D-1415. The results obtained may be found on Tables 1 and 2.

Example 1

A batch of ethylene vinyl acetate elastomer available as Elvax™ 240, was masticated on a two roll mill until an acceptable bead was established in the conventional manner. Thereafter, for each 100 parts of ethylene vinyl acetate elastomer, and in accordance with the formulation list on Table 1, 25 parts of Hisil™ 230, a hydrated amorphous silica reinforcing pigment, 3 parts of zinc oxide, 3 parts of stearic acid, 3 parts of trioctyl trimillitate, 2 parts of bis(tert-butyl peroxy isopropyl)benzene peroxide available as Perkadox™ 1440, were added slowly to the flux roll and the band was cut and mixed until a uniform, smooth band developed. Thereafter the unvulcanized compound strip was cut and divided for testing as above-described.

Examples 2–11

Elastomer compositions were produced by repeating the procedure of Example 1 except that the formulations for Examples 2–11, which may be found on Table 1 were followed.

Example 2 involved the addition of 2.8 parts zinc diacrylate and 0.2 parts zinc stearate to the flux roll.

Example 3 involved the addition of 2.8 parts zinc diacrylate and 2.2 parts zinc stearate to the flux roll.

Example 4 involved the addition of 2.8 parts zinc diacrylate and 5.2 parts zinc stearate to the flux roll.

Examples 5 and 6 involved the addition of 2.8 parts zinc diacrylate and 10.2 parts zinc stearate to the flux roll.

Example 7 involved the addition of 3.8 parts of zinc dimethacrylate to the flux roll.

Example 8 involved the addition of 3.8 parts of zinc dimethacrylate and 10.0 parts zinc stearate to the flux roll.

Example 9 involved the addition of 2.4 parts of zinc diacrylate and 0.6 parts of zinc stearate to the flux roll.

Example 10 involved the addition of 2.4 parts of calcium diacrylate to the flux roll.

Example 11 involved the addition of 3 parts of calcium diacrylate and 10.0 parts calcium stearate.

Example 12

Example 12 involved substituting ethylene propylene diene (EPDM) terpolymer, available as Nordel™ 1040, in place of the EVA of Example 1. The EPDM was masticated as for Example 1 and, thereafter, for each 100 parts of EPDM, and in accordance with the formulation listed on Table 2, 100 parts of semi-reinforcing carbon black N762, 50 parts of SUNPAR™ 2280, a proprietary plasticizer, 5 parts of zinc oxide, 1 part of stearic acid, 1 part of polymerized, 1,2-dihydro-2,2,4-trimethylquinoline, an antioxidant resin available as AGERITE RESIN D, and 2 parts of PERKADOX™ 1440 peroxide were added slowly to the flux roll. The band was cut and tested as for Example 1.

Examples 13–16

Compositions were produced according to Example 12 except that the formulations for Examples 13–16, which may be found on Table 2 were followed.

Example 13 involved the addition of 2.8 parts zinc diacrylate to the flux roll.

Example 15 involved the addition of 0.9 parts zinc diacrylate and 1.9 parts zinc stearate to the flux roll.

Example 15 involved the addition of 2.8 parts zinc diacrylate and 6.0 parts zinc stearate to the flux roll.

Example 16 involved the addition of 4.8 parts zinc diacrylate and 10.2 parts zinc stearate to the flux roll.

TABLE 1

| EXAMPLE | 1 | 2 | 3 | 4 | 5 | 6 | 7 | 8 | 9 | 10 | 11 |
|---|---|---|---|---|---|---|---|---|---|---|---|
| Elvax 240[1] | 100 | 100 | 100 | 100 | 100 | 100 | 100 | 100 | 100 | 100 | 100 |
| HiSil 230[2] | 25 | 25 | 25 | 25 | 25 | 25 | 25 | 25 | 25 | 25 | 25 |
| Zinc Oxide | 3 | 3 | 3 | 3 | 3 | 3 | 3 | 3 | 3 | 3 | 3 |
| Stearic Acid | 3 | 3 | 3 | 3 | 3 | 3 | 3 | 3 | 3 | 3 | 3 |
| TOTM | 3 | 3 | 3 | 3 | 3 | 3 | 3 | 3 | 3 | 3 | 3 |
| Perkadox 1440[3] | 2 | 2 | 2 | 2 | 2 | 2 | 2 | 2 | 2 | 2 | 2 |
| Zinc diacrylate | — | 2.8 | 2.8 | 2.8 | 2.8 | 2.8 | — | — | 2.4 | — | — |
| Zinc dimethacrylate | — | — | — | — | — | — | 3.8 | 3.8 | — | — | — |
| Calcium diacrylate | — | — | — | — | — | — | — | — | — | 2.4 | 3 |
| Zinc stearate | — | 0.2 | 2.2 | 5.2 | 10.2 | 10.2 | — | 10.0 | 0.6 | — | — |
| Calcium stearate | — | — | — | — | — | — | — | — | — | — | 10.0 |
| Lap shear adhesion (CRS, 320° F., 25 min., psi) | 116 | 760 | 240 | 150 | 140 | 110 | 410 | 95 | 400 | 570 | 80 |
| ODR, 320° F. | | | | | | | | | | | |
| Scorch Time $TS_1$, min. | — | 1.9 | 1.9 | 1.2 | — | 2.1 | 3.0 | 4.9 | 1.9 | 2.3 | 2.0 |
| Cure Time TC (90) min. | — | 17.7 | 26.8 | 20.1 | — | 18.2 | 19.2 | 26.5 | 21.5 | 18.5 | 26.5 |
| Core Viscosity | — | 26.7 | 26.1 | 23.1 | — | 13.0 | 22.4 | 11.1 | 25.9 | 30.7 | 28.7 |

TABLE 1-continued

| EXAMPLE | 1 | 2 | 3 | 4 | 5 | 6 | 7 | 8 | 9 | 10 | 11 |
|---|---|---|---|---|---|---|---|---|---|---|---|
| MH, in.-ib. | | | | | | | | | | | |
| Shore A hardness | — | — | — | — | — | — | — | — | — | 82 | 77 |
| Tensile strength (psi) | — | — | — | — | — | — | — | — | — | 1900 | 960 |
| Elongation (%) | — | — | — | — | — | — | — | — | — | 970 | 950 |
| Modulus$_{100}$ (psi) | — | — | — | — | — | — | — | — | — | 570 | 360 |
| Mold Release | — | Poor | Poor | Good | Good | Good | Poor | Good | Poor | Poor | Good |

[1] Ethylene vinyl acetate elastomer available from DuPont Co., Wilmington, Delaware.
[2] Hydrated amorphous silica reinforcing pigment available from PPG, Pittsburgh, Pennsylvania.
[3] Bis(tert-butyl peroxy isopropyl)benzene available from AKZO Chemical, Chicago, Illinois.

TABLE 2

| EXAMPLE | 12 | 13 | 14 | 15 | 16 |
|---|---|---|---|---|---|
| Nordel 1040[1] | 100 | 100 | 100 | 100 | 100 |
| N762 Carbon Black | 100 | 100 | 100 | 100 | 100 |
| Sunpar 2280[2] | 50 | 50 | 50 | 50 | 50 |
| Zinc Oxide | 5 | 5 | 5 | 5 | 5 |
| Stearic Acid | 1 | 1 | 1 | 1 | 1 |
| Resin D[3] | 1 | 1 | 1 | 1 | 1 |
| Perkadox 1440 | 2 | 2 | 2 | 2 | 2 |
| Zinc diacrylate | — | 2.8 | 0.9 | 2.8 | 4.8 |
| Zinc stearate | — | — | 1.9 | 6.0 | 10.2 |
| Lap Shear adhesion (CRS, 330° F., psi) | 30 | 540 | 130 | 70 | 50 |
| Shore A Hardness | 44 | 50 | 48 | 52 | 55 |
| Tensile strength (psi) | — | 640 | 420 | 800 | 900 |
| Elongation, (%) | — | 1400 | 1400 | 1500 | 1400 |
| Modulus$_{100}$ (psi) | — | 80 | 80 | 90 | 130 |
| Mold Release | — | Poor | Good | Good | Good |

[1] Ethylene propylene diene elastomer available from DuPont Co.
[2] Proprietary processing aid available from Sun Refining and Marketing Co., Philadelphia, Pennsylvania.
[3] Antioxidant available from R.T. Vanderbilt Co., Norwalk, Connecticut.

As is apparent from the data reported on Tables 1 and 2, the use of high levels of a fatty acid metal salt produced a marked improvement in mold release. For those compositions containing an α, β-ethylenically unsaturated carboxylic acid metal salt the absence of, or low levels of, the fatty acid metal salt resulted in an elastomer composition having high lap shear adhesion. Further, in such compositions, the cured elastomer plaque stuck badly to the mold and the mold had to be hammered apart.

In those compositions in which a high level of fatty acid metal salt was utilized, a marked decrease in lap shear adhesion and improved mold release was noted. At the same time, no loss of cross-link density was noted as was indicated by the fact that ODR torque measurements remained high.

Other embodiments of the invention will be apparent to those skilled in the art from a consideration of this specification or practice of the invention disclosed herein. It is intended that the specification and examples be considered as exemplary only, with the true score and spirit of the invention being indicated in the following claims.

What is claimed is:

1. A curable elastomer composition with improved mold release, comprising:

a. an elastomer;

b. a crosslinking-effective amount in the range of about 0.1 to about 20 parts by weight per 100 parts by weight of elastomer of a metal salt of an α, β-ethylenically unsaturated carboxylic acid selected from the group consisting of zinc diacrylate, zinc dimethacrylate, and calcium diacrylate;

c. a mold releasing-effective amount in a range of 1.5 to 3.64 parts by weight per part of metal salt of an α, β-ethylenically unsaturated carboxylic acid of a metal salt of a fatty acid; and d. a cure-effective amount of an organic peroxide in an amount of from about 0.1 to about 15 parts by weight per 100 parts by weight of elastomer.

2. The curable elastomer composition of claim 1, wherein the ratio by weight of the fatty acid metal salt to the α, β-ethylenically unsaturated carboxylic acid metal salt is about 2:1.

3. The curable elastomer composition of claim 1, wherein the fatty acid metal salt is a metal salt of stearic acid.

4. The curable elastomer composition of claim 3, wherein the fatty acid metal salt is zinc stearate.

5. The curable elastomer composition of claim 3, wherein the fatty acid metal salt is calcium stearate.

6. The curable composition of claim 1, wherein the elastomer is ethylene vinyl acetate elastomer.

7. The curable composition of claim 1, wherein the elastomer is ethylene propylene diene elastomer.

8. A cured composition provided by curing the composition of claim 1.

9. A method for providing a curable elastomer composition with improved mold release, comprising the steps of:

(a) preparing a curable elastomer composition comprising an elastomer, a cross-linking effective amount of a metal salt of an α, β-ethylenically unsaturated carboxylic acid, selected from the group consisting of zinc diacrylate, zinc dimethacrylate, and calcium diacrylate, and a cure-effective amount of an organic peroxide; and (b) adding a mold releasing effective amount of a metal salt of a fatty acid into the curable elastomer composition, wherein the ratio by weight of the fatty acid metal salt to the α, β-ethylenically unsaturated carboxylic acid metal salt is from about 1.5:1 to about 3.64:1 and wherein the ratio by weight of an α, β-ethylenically unsaturated carboxylic acid metal salt to the elastomer is about 0.1 to about 20 parts per 100 parts of the elastomer.

10. The method of claim 1, wherein the ratio by weight of the fatty acid metal salt to the α, β-ethylenically unsaturated carboxylic acid metal salt is about 2:1.

* * * * *